(12) United States Patent
Sulmone

(10) Patent No.: US 7,416,223 B1
(45) Date of Patent: Aug. 26, 2008

(54) FIRE HOSE CONNECTION WITH A PRESSURE RELIEVING SAFETY FEATURE

(76) Inventor: Michael Sulmone, 2009 Sweetgum La., Collegeville, PA (US) 19426

( * ) Notice: Subject to any disclaimer, the term of this patent is extended or adjusted under 35 U.S.C. 154(b) by 0 days.

(21) Appl. No.: 10/348,791

(22) Filed: Jan. 22, 2003

Related U.S. Application Data

(60) Provisional application No. 60/351,217, filed on Jan. 23, 2002.

(51) Int. Cl.
*F16L 55/00* (2006.01)
*F16L 15/00* (2006.01)

(52) U.S. Cl. .................. 285/13; 285/14; 285/391; 285/924

(58) Field of Classification Search ............ 285/13, 285/14, 391, 924; D29/129
See application file for complete search history.

(56) References Cited

U.S. PATENT DOCUMENTS

| | | | |
|---|---|---|---|
| 230,828 A | | 8/1880 | Shaw |
| 900,533 A | * | 10/1908 | Hawley .................. 285/13 |
| 1,167,832 A | * | 1/1916 | Martin ................... 285/93 |
| 1,216,499 A | * | 2/1917 | Roeefs .................. 137/312 |
| 1,528,566 A | | 3/1925 | Podel |
| 1,808,702 A | | 6/1931 | Williams |
| 2,305,590 A | | 12/1942 | Marburg et al. |
| 2,323,099 A | * | 6/1943 | Patten .................... 285/14 |
| 2,507,248 A | | 5/1950 | Swart |
| 2,577,851 A | | 12/1951 | Hribar |
| 2,633,866 A | | 4/1953 | Reasoner |
| 2,676,782 A | | 4/1954 | Bostock et al. |
| 2,889,156 A | * | 6/1959 | Dearing et al. ........... 285/55 |
| 3,393,267 A | * | 7/1968 | Busse .................... 174/78 |
| 3,414,001 A | * | 12/1968 | Woodford ............... 137/216 |
| 3,463,181 A | | 8/1969 | Hastings |
| 3,521,910 A | * | 7/1970 | Callahan, Jr. et al. ....... 285/14 |
| 3,540,762 A | * | 11/1970 | Dunlap .................. 285/391 |
| 3,584,900 A | * | 6/1971 | Lennon et al. ............. 285/14 |
| 3,822,902 A | * | 7/1974 | Maurer et al. ............. 285/94 |
| 3,848,631 A | | 11/1974 | Fallon |
| 3,913,949 A | * | 10/1975 | Senatro .................. 285/14 |
| 4,032,028 A | | 6/1977 | Reiss et al. |
| 4,253,683 A | * | 3/1981 | Jentsch et al. ............ 285/13 |
| 4,325,398 A | | 4/1982 | Green |
| 4,402,531 A | * | 9/1983 | Kennedy, Jr. ............. 285/14 |
| 4,432,391 A | | 2/1984 | Ott |
| 4,457,325 A | | 7/1984 | Green |
| 4,623,123 A | * | 11/1986 | Traylor ................... 251/340 |
| 4,661,029 A | * | 4/1987 | Miller ................... 409/233 |
| 6,079,519 A | | 6/2000 | Lottes |

* cited by examiner

*Primary Examiner*—James M Hewitt
(74) *Attorney, Agent, or Firm*—Dilworth Paxson LLP

(57) ABSTRACT

A coupling device for an adapter connection point, including a first fitting and a second fitting, wherein at least one of the first and the second fittings includes at least one channel, and wherein when a user begins to disengage the coupling device any trapped pressure will be relieved through the at least one channel prior to total disengagement of the coupling device.

12 Claims, 2 Drawing Sheets

SECTION B-B

FIRE HOSE CONNECTION WITH A PRESSURE RELIEVING SAFETY FEATURE

CROSS-REFERENCE TO RELATED APPLICATIONS

This application claims priority to U.S. provisional application Ser. No. 60/351,217 filed Jan. 23, 2002, the entirety of which is incorporated herein by reference.

FIELD OF THE INVENTION

The present invention relates generally to fittings. More particularly, it relates to fittings for use in connection with fire hoses.

BACKGROUND

Firefighters have long been exposed to severe injuries from explosively propelled fire hose fittings. Fire trucks and stationary fire protection systems have many hose and adapter connection points that use fire hose thread for engagement. Trapped pressure is a constant hazard in this system, particularly when a firefighter tries to unscrew a connection. The trapped pressure can store a great deal of energy that, when released, can propel the fitting. This scenario has resulted in serious injury in the past. This situation is exacerbated when the trapped pressure includes a compressible gas like air.

The fire hose connection points use a face seal gasket to provide for a water-tight joint. When the threads are unscrewed with pressure in the system, the joint will leak slowly, but still retain pressure for an extended period of time due to the fact that the trapped fluid must travel through a narrow leak-path defined by the space between the male and female threads. If there is only compressed air in the system, there is no visual indication of the pressure. If water is present, the small discharge of water during this process is often even less at higher pressures than at lower pressures due to the fact that the pressure provides a tighter seal between the two surfaces of the male and female threads. This can lead the firefighter into believing that it is safe to uncouple the connection. The firefighter may not hear the louder "hissing" when the system is leaking at high pressure due to the noisy environment at the fire scene and the equipment worn by firefighters. The noise, therefore, which is usually the only indication of high pressure and a potentially dangerous situation, is an inadequate warning signal for firefighters.

SUMMARY OF THE INVENTION

A coupling device for an adapter connection point, including a first fitting and a second fitting, wherein at least one of the first and the second fittings includes at least one channel, and wherein when a user begins to disengage the coupling device any trapped pressure will be relieved through the at least one channel prior to total disengagement of the coupling device.

DETAILED DESCRIPTION OF THE PREFERRED EMBODIMENTS

The following definitions are provided to aid in construing the claims of the present application:

Adapter Connection Point: For the purposes of the present application, any fire hose end, or any cap, elbow, adapter, plug, valve, extension, hose end, or other fitting used in connection with fire trucks or stationary fire protection systems.

Backwards Compatible: For the purposes of the present application, backwards compatible with the existing installed base.

Channel: For the purposes of the present application, any path through which pressure can flow, including a path along an interior or exterior surface of a fitting, such as a series of axially aligned interruptions in the thread of a fitting, or a path through a wall of a fitting, such as a tunnel drilled from a point on a fitting covered when the fitting is coupled to a point on the exterior of the fitting. Other channels are also possible and the present application is intended to encompass them as well.

Thread; Fitting: For the purposes of the present application, the term "thread" will be used to refer to and to describe a standard fitting or a threaded fitting. Similarly, the terms "male thread" will be used to refer to and to describe a standard fitting with male threads or a threaded fitting with male threads, also referred to generally as a male threaded fitting. Additionally, the term "female thread" will be used to refer to and to describe a standard fitting with female threads or a threaded fitting with female threads also referred to generally as a female threaded fitting.

Figure 1:
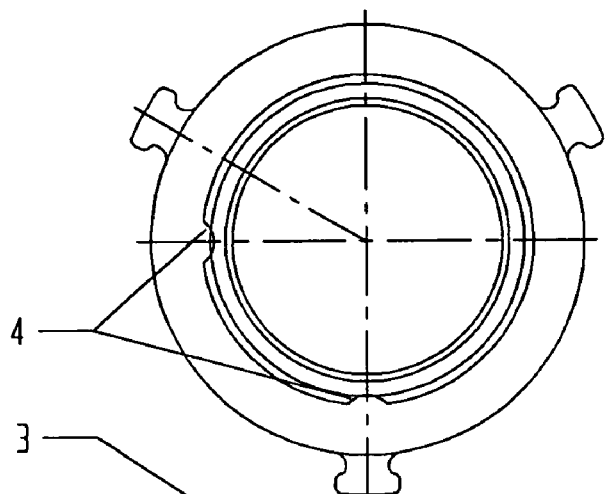
FIG. 1 is a top view of the male thread in a first embodiment of the present invention.

FIGS. 1 through 4 illustrate a first embodiment of the present invention. Referring to FIG. 1, male thread 1 of a coupling device is illustrated. Other than interruptions 4, male thread 1 of a standard fitting is used with fire trucks and other fire protection systems. Male thread 1 can be constructed of metal or plastic, but is typically constructed of a plastic or an aluminum, brass, iron, or stainless steel alloy, and if a metal alloy is used, it is often treated with a surface treatment to protect against corrosion and other forms of oxidation. Examples of currently available fittings suitable for use having male thread 1 (other than for their lacking interruptions 4) include the model UR-25 valve available from the Elkhart Brass Manufacturing Company of Elkhart, Ind. (www.elkhartbrass.com), models IL-31E or IL-35S from South Park Corporation (www.spcbrass.com), and model HF500 from W.S. Darley & Co. of Melrose Park, Ill.

Figure 2:
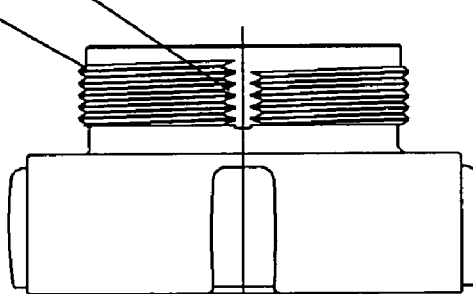
FIG. 2 is a side view of the male thread in a first embodiment of the present invention.

Male thread 1 rather than being continuous as is usual in a threaded fitting, has a series of interruptions or discontinuities in the thread, which are axially aligned in the first embodiment, as illustrated by FIG. 2. In other embodiments, a diagonal alignment is possible, and the presence of additional interruptions, perpendicular to axially aligned interruptions or otherwise, is also possible. The size and number of interruptions and the number of axial leak paths can vary in different embodiments. Increasing the size of the interruptions, the number of the interruptions, or the number of axial leak paths, will tend to improve the pressure relieving properties of the coupling device, but will also tend to decrease the strength of the coupling device.

Figure 3:
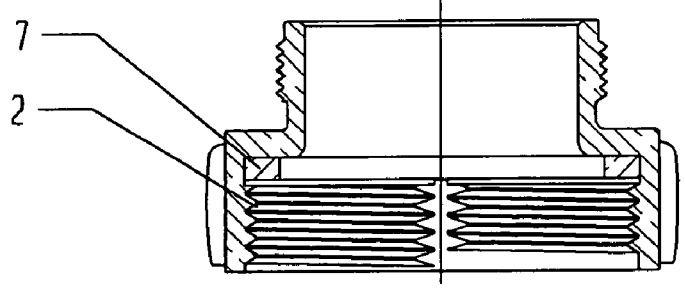
FIG. 3 is side view of the female thread in a first embodiment of the present invention.

FIG. 3 illustrates the female thread 2 in the first embodiment of the present invention. Except for the presence of interruptions similar to those in male thread 1, female thread 2 of a standard fitting is used with fire trucks and other fire protection systems. Female thread 2 of a standard fitting includes rubber sealing element 7 located in the interior of the fitting at the end of the threaded portion and which acts to form a tight seal when a male threaded fitting is completely engaged.

Female thread 2 can be constructed of metal or plastic, but is typically constructed of a plastic or an aluminum, brass, iron, or stainless steel alloy, and if a metal alloy is used, it is often treated with a surface treatment to protect against corrosion and other forms of oxidation. Examples of currently available fittings suitable for use as having female thread 2 (other then for their lacking interruptions) include the model 345 cap available from the Akron Brass Company of Wooster, Ohio (www.akronbrass.com), model HCC-28 from South Park Corporation (www.spcbrass.com), and model 01.006.0 from Trident Emergency Products LLC of Bellmawr, N.J.

Figure 4:
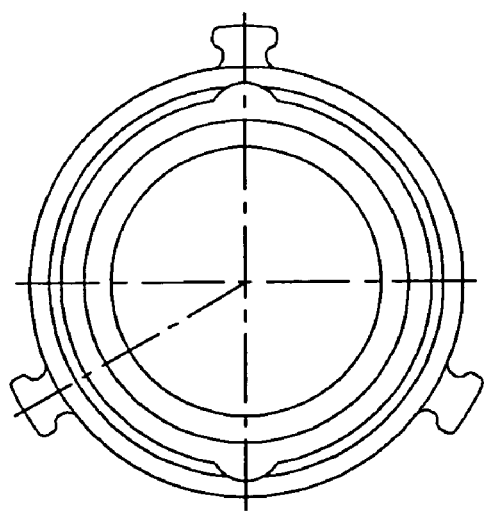
FIG. 4 is a top view of the female thread in a first embodiment of the present invention.

Female thread 2 rather than being continuous as is usual in a threaded fitting, has a series of interruptions or discontinuities in the thread, which are axially aligned in the first embodiment, as illustrated by FIG. 4. In other embodiments, a diagonal alignment is possible, and the presence of additional interruptions, perpendicular to axially aligned interruptions or otherwise, is also possible. The size and number of interruptions and the number of axial leak paths can vary in different embodiments. Increasing the size of the interruptions, the number of interruptions, or the number of axial leak paths, will tend to improve the pressure relieving properties of the coupling device, but will also tend to decrease the strength of the coupling device.

Referring to FIGS. 1 and 4, the interruptions on male thread 1 and female thread 2 are radially staggered. The interruptions in female thread 2 form two channels spread evenly 180 degrees apart. The interruptions in male thread 1 also form two channels; however, they are spread only 90 degrees apart. The advantage of this pattern of interruption placement is that with the use of only two channels on each thread, a channel on male thread 1 and a channel on female thread 2 nevertheless fully align every time one of the fittings is turned 90 degrees. If the channels were all evenly spread, full alignment would occur only when one of the fittings was turned 180 degrees. Alignment of channels on both threads results in maximum relief of pressure and is hence desirable. It is not, however, necessary. Radial staggering can also be accomplished through the use of different numbers of channels on a thread.

The use of interruptions (or other channels) on both the male and female threads is unnecessary, although it does provide maximum relief of pressure without undue weakening of fittings. In the first embodiment, the male and female threads are both designed to be backward compatible. Either can not only be used with standard prior art fittings, but they will function so as to reduce pressure in accordance with the present invention, although not quite as effectively as when two pressure relieving fittings are used together.

In practice, when a firefighter attempts to disengage a coupling device in accordance with the first embodiment of the present invention, if there is pressure built up behind it, there will initially be a tight seal provided by rubber sealing element 7 and no liquid or gas will escape. As the firefighter turns the outer fitting, the seal provided by rubber sealing element 7 is disengaged and the interruptions in the male and female threads will provide channels for gas and liquid to escape before the outer fitting is disengaged. Water and compressed air may therefore shoot out through the channels provided by the interruptions to the sides of the fitting and away from the firefighter while the fitting remains partially and safely engaged. If the firefighter observes shooting water, he can wait until the flow of water ceases before completely disengaging the outer fitting to ensure safety. In any event, the likelihood of an accident will be greatly reduced.

Figure 5:
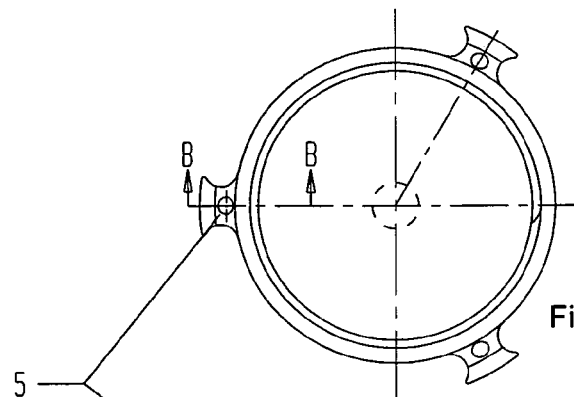
FIG. 5 is a top view of a fitting in a second embodiment of the present invention.
Figure 6:
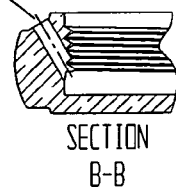
FIG. 6 is a cross-section view of a fitting in a second embodiment of the present invention.

FIG. 5 illustrates a second embodiment of the present invention. In the second embodiment, a threaded fitting has three vent holes 5 drilled in it from the lower portion of the thread to the exterior of the fitting. Each vent hole forms a channel through the wall of at least one of the fittings beginning at the point on the interior of the fitting, the channel being covered by other fitting when the male and female fittings are completely engaged. FIG. 6 illustrates a cross-section of the fitting. Other than vent holes 5, the fitting is a standard fitting used with fire trucks and other fire protection systems. The fitting can be constructed of metal or plastic, but is typically constructed of a plastic or an aluminum, brass, iron, or stainless steel alloy, and if a metal alloy is used, it is often treated with a surface treatment to protect against corrosion and other forms of oxidation. Examples of currently available fittings suitable for use (other than for their lacking interruptions) include the model 345 cap available for the Akron Brass Company of Wooster, Ohio (www.akronbrass.com), model HCC-28 from South Park Corporation (www.spcbrass.com), and model 01.006.0 from Trident Emergency Products LLC of Bellmawr, N.J. The size and number of vent holes can be varied. The greater number of vent holes, the larger the size of the vent holes, or both, the greater the pressure relieving the function of the fitting, but the weaker the structural integrity thereof. The fittings of the second embodiment like those of the first embodiment are backward compatible and are usable with standard prior art filings.

Figure 7:
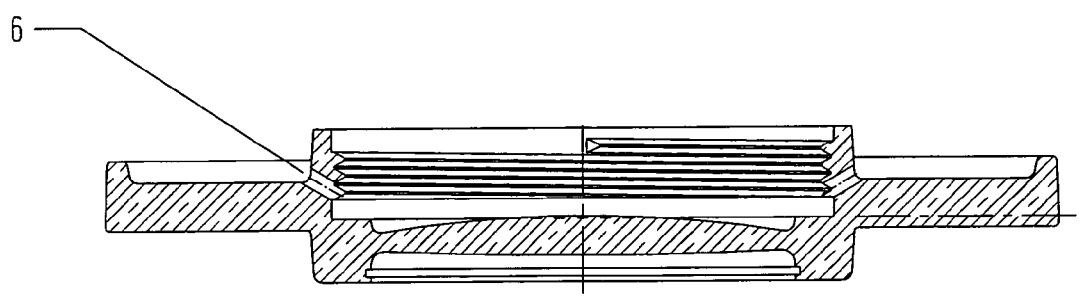
FIG. 7 is a side view of a fitting in a third embodiment of the present invention.

FIG. 7 illustrates a third embodiment of the present invention. In the third embodiment, a threaded fitting has two vent holes 6 drilled in it from the lower portion of the thread to the exterior of the fitting. Other than channels 6, the fitting is a standard fitting used with fire trucks and other fire protection systems. The fitting can be constructed of metal or plastic, but is typically constructed of a plastic or an aluminum, brass, iron, or stainless steel alloy, and if a metal alloy is used, it is often treated with a surface treatment to protect against corrosion and other forms of oxidation. Examples of currently available fittings suitable for use (other than for their lacking interruptions) include the model 345 cap available from the Akron Brass Company of Wooster, Ohio (www.akronbrass.com), model HCC-28 from South Park Corporation (www.spcbrass.com), and model 01.006.0 from Trident Emergency Products LLC of Bellmawr, N.J. The size and number of vent holes can be varied. The greater the number of vent holes, the larger the size of the vent holes, or both, the greater the pressure relieving function of the fitting, but the weaker the structural integrity thereof. The fittings of the second embodiment like those of the first embodiment are backward compatible and are usable with standard prior art fittings.

A non-threaded type fitting can also contain the pressure relieving feature of this invention. The typical type of non-threaded fitting that is used in the fire service is a Storz fitting. It is a bayonet style fitting where the user connects the two halves and twists it about 120° which compresses the face seals of the two halves to secure it. In one embodiment, a pressure relieving Storz cap allows the operator to back off (loosen) the cap by twisting it less than the amount needed to disengage the coupling, but far enough to allow the face seals to unseat. At this point the cap encounters a stop (or latch) which must be manually actuated to continue twisting the parts through to total disengagement. Pressure, in the form of liquid or gas, can then escape through channels in the Storz fitting.

The present invention may be embodied in other specific forms without departing from the spirit or essential attributes of the invention. Accordingly, reference should be made to the appended claims, rather than the foregoing specification, as indicating the scope of the invention.

That which is claimed is:

1. A coupling device for a fire hose, comprising:
    coupling means for creating a seal at an adapter connection point; and
    pressure relieving means for relieving trapped pressure at an adapter connection point,
    wherein the coupling means comprises a first fitting having threads and a second fitting having threads, and
    wherein the pressure relieving means comprises at least one channel in at least one of the threads of the first fitting and the threads of the second fitting for directing the trapped pressure away from a user when the seal is disengaged while the coupling means is engaged.

2. The coupling device of claim 1, wherein the pressure relieving means provides a visual indication of any pressure present in the fire hose when the seal is disengaged.

3. A coupling device for an adapter connection point, comprising:
    a first fitting, the first fitting comprises a male fitting having threads,
    a second fitting, the second fitting comprises a female fitting having threads,
    wherein the first fitting and the second fitting are capable of forming a seal when completely engaged,
    wherein at least one of the first fitting and the second fitting comprise at least one channel comprising a leak path for relieving pressure at the adapter connection point, and
    wherein the at least one channel is in at least one of the threads of the first fitting and the threads of the second fitting and is capable of relieving pressure when the seal is disengaged before the first fitting and the second fitting are disengaged.

4. A coupling device for an adapter connection point, comprising:
    a first fitting, the first fitting comprises a male fitting having threads, and
    a second fitting, the second fitting comprises a female fitting having threads,
    wherein the first fitting and the second fitting are capable of being engaged with one another and forming a seal when completely engaged,
    wherein at least one of the first the second fitting comprises at least one channel in the threads
    wherein when the seal is disengaged any pressure at the adapter connection point is relieved through the at least one channel before the first fitting and the second fitting are disengaged from one another, and
    wherein the first fitting and second fitting are backwards compatible.

5. A coupling device for an adapter connection point, comprising:
    a first fitting; and
    a second fitting,
    wherein at least one of the first and the second fittings comprises at least one channel;
    wherein when a user begins to disengage the first and second fittings any trapped pressure will be relieved through the at least one channel prior to total disengagement of the first and second fittings;
    wherein the first and second fittings are threaded;
    wherein the first fitting is male;
    wherein the second fitting is female; and
    wherein the at least one channel comprises at least one channel through the wall of at least one of the fittings, beginning at a point on the interior of the fitting, the at least one channel being covered by the other fitting when the first and second fittings are completely engaged.

6. A pressure relieving safety device for an adapter connection point, comprising:
    a male fitting having threads, and
    a female fitting having threads,
    wherein at least one of the male fitting and the female fitting comprise at least one channel;
    the at least one channel comprises at least one interruption in the threads of at least one of the fittings,
    wherein the at least one channel is sealed when the male fitting and the female fitting are completely engaged, and
    wherein the at least one channel relieves pressure at the adapter connection point when the male fitting and the female fitting are engaged.

7. A coupling device for an adapter connection point, comprising,
    a male fitting having threads,
    a female fitting having threads, and
    at least one channel in at least one of the threads of the male fitting or the female fitting,
    wherein the male fitting is configured to form a seal when completely engaged with the female fitting, the seal prevents escape of liquid and gas from the adapter connection point through the at least one channel, and
    wherein the at least one channel is configured for liquid and gas to escape when the male fitting is engaged with the female fitting.

8. The coupling device of claim 7, wherein the at least one channel comprises at least one interruption in the threads of the male fitting.

9. The coupling device of claim 7, wherein the at least one channel comprises at least one interruption in the threads of the female fitting.

10. The coupling device of claim 7, wherein at least one channel comprises at least one interruption in the threads of the male fitting and at least one in the threads of the female fitting.

11. The coupling device of claim 10, wherein the interruptions comprise an axial interruption or a diagonal interruption.

12. The coupling device of claim 7, wherein the at least one channel comprises a tunnel through a wall of at least one of the male fitting or the female fitting.

* * * * *